United States Patent [19]
Cassiday et al.

[11] Patent Number: 5,978,419
[45] Date of Patent: Nov. 2, 1999

[54] TRANSMITTER AND RECEIVER CIRCUITS FOR HIGH-SPEED PARALLEL DIGITAL DATA TRANSMISSION LINK

[75] Inventors: Daniel R. Cassiday, Topsfield; Soroush Shakib, Acton, both of Mass.; Derek Tsai, San Jose, Calif.; Mistsuo Magane, Sanda; Katsushi Asahina, Toneyama Toyonaka, both of Japan

[73] Assignee: Sun Microsystems, Inc., Palo Alto, Calif.

[21] Appl. No.: 08/881,471

[22] Filed: Jun. 24, 1997

[51] Int. Cl.[6] ............................................ H04B 3/00
[52] U.S. Cl. ..................... 375/257; 375/260; 375/358; 375/295; 395/551
[58] Field of Search ................................. 375/257, 358, 375/260, 213, 295; 364/825; 370/476, 535; 395/551

[56] References Cited

U.S. PATENT DOCUMENTS

| | | | |
|---|---|---|---|
| 5,426,644 | 6/1995 | Fujimoto | 370/535 |
| 5,570,356 | 10/1996 | Finney et al. | 370/476 |
| 5,666,302 | 9/1997 | Tanaka et al. | 364/825 |
| 5,799,175 | 8/1998 | Cassiday et al. | 395/551 |

*Primary Examiner*—Stephen Chin
*Assistant Examiner*—Shu Wang Liu
*Attorney, Agent, or Firm*—Richard A. Jordan

[57] ABSTRACT

An information transfer system includes a transmitter and a receiver for transferring information over a differential communication link. The transmitter circuit includes a plurality of gated driver circuits each associated with one of a plurality separate phases of a clock signal, all of the gated driver circuits having respective outputs connected to a differential driver. Each gated driver circuit receives at a respective input a respective one of a plurality of selected information signals and transmits it over the communication link in response to the associated clock signal phase. A plurality of information selectors, each associated one of the gated driver circuits, are connected to receive a plurality of information signals each from a respective one of a plurality of digital information sources and selectively couple one of the information signals to the associated gated driver circuit as the respective selected information signal during a clock signal phase ahead of the clock signal phase ahead of the clock signal phase with which the associated gated driver circuit is associated. The receiver circuit includes a differential receiver which generates a single-ended signal representative of digital data in response the differential signals transmitted over the wires comprising the differential communication link. The differential receiver has a plurality of inputs each for connection to one of the wires of the differential communication link. A termination resistor is connected between the differential receiver inputs, and a continuity test circuit applies a test voltage to one of the differential receiver inputs during a link test operation. The digital receiver generates the single ended signal representative of digital data provided by the transmitter circuit the appropriate digital data value if the wires are continuous between the transmitter circuit and the receiver circuit. However, if at least one of the wires is not continuous, the differential receiver will provide a single-ended signal representative of the wrong digital data value.

11 Claims, 4 Drawing Sheets

| # TRANSMITTER AND RECEIVER CIRCUITS FOR HIGH-SPEED PARALLEL DIGITAL DATA TRANSMISSION LINK

INCORPORATION BY REFERENCE

U.S. patent application Ser. No. 08/674,316, filed Jul. 1, 1996, in the name of Daniel Cassiday, et al., and entitled "Synchronization System And Method For Plesiochronous Signaling," (hereinafter referred to as the "Cassiday patent application") assigned to one of the assignees of the present invention, incorporated herein by reference.

FIELD OF THE INVENTION

The invention relates generally to the field of digital data communications, and more particularly to systems and methods for transferring digital data between a transmitter and a receiver in a digital communications system.

BACKGROUND OF THE INVENTION

In a digital communications system, a transmitter transmits digital data in the form of signals to a receiver over one or more communication links. The aforementioned Cassiday patent application describes a digital communications system in which information signals are transmitted from the transmitter to the receiver along with a clocking signal, which serves to synchronize the transfer of the information signals therebetween. In that system, the information is transferred at high speed on both the leading and trailing edges of the clocking signal, which creates a number of problems. First, so that the transmitter circuit can transmit the information at high speed, it will be necessary minimize the propagation delay, and the differences in propagation delay, from the transmitter's circuits in which the information is stored, to the circuits which select and drive the signals onto the links interconnecting the transmitter and receiver. This is a particular problem in connection with digital communications systems for use in modern digital systems, which typically include testing circuitry for performing a number of types of tests to determine whether the system is operating correctly, and, if not, which portion(s) of the system is (are) operating incorrectly. Typically, such testing circuitry adds circuitry to the transmitter and receiver which can increase the propagation delay problems and may require reduction in the rate of information transmission from the transmitter to the receiver.

SUMMARY OF THE INVENTION

The invention provides new and improved transmitter and receiver circuits for transmitting and receiving signals in a digital communications system.

In brief summary, in one embodiment, the invention provides a transmitter circuit for transmitting a digital data signal over a communication link on both a leading edge and a trailing edge of a clock signal. The transmitter circuit comprises a leading edge gated driver circuit, a leading edge information selector, a trailing edge gated driver circuit, a trailing edge information selector, and a differential driver. The leading edge gated driver circuit receives at an input a leading edge selected information signal and transfers it to the differential driver for transmission over the communication link as the digital data signal in response to the leading edge of the clock signal, and is disabled at the trailing edge of the clock signal. The leading edge information selector comprises a leading edge multiplexer and a leading edge buffer. The leading edge multiplexer selectively couples one of a buffered information signal from a leading edge buffer and an information signal from at least one other information source (illustratively, a test information source) to the leading edge gated driver circuit as the leading edge selected information signal. The leading edge buffer receives and buffers leading edge transmit information from a transmit information source, the leading edge buffer receiving the leading edge information in response to the leading edge of the clock signal and providing the buffered leading edge transmit information to the leading edge multiplexer on a subsequent trailing edge of the clock signal, so that the leading edge selected information signal will be settled at the input of the leading edge gated driver at the leading edge of the clock signal.

Similarly, the trailing edge gated driver circuit receives at an input a trailing edge selected information signal and transfers it to the differential driver for transmission over the communication link as the digital data signal in response to the trailing edge of the clock signal, and is disabled at the leading edge of the clock signal. The trailing edge information selector comprises a trailing edge multiplexer and a trailing edge buffer. The trailing edge multiplexer selectively couples one of a buffered information signal from the trailing edge buffer and an information signal from at least one other information source (illustratively, a test information source) to the trailing edge gated driver circuit as the trailing edge selected information signal. The trailing edge buffer receives and buffers leading edge transmit information from a transmit information source, the trailing edge buffer receiving the leading edge information in response to the leading edge of the clock signal and providing the buffered leading edge transmit information to the leading edge multiplexer on a subsequent leading edge of the clock signal, so that the trailing edge selected information signal will be settled at the input of the trailing edge gated driver at the trailing edge of the clock signal.

The receiver circuit comprises a receiver and a receive buffer. The receiver receives the digital data signal from the communication link and provides the digital data signal as a received data signal. The receive buffer comprises a leading edge receive buffer and a trailing edge receive buffer. The leading edge receive buffer receives and buffers the received data signal in response to the leading edge of a receive clock signal and provides the received data signal as a leading edge received data signal to a downstream utilization element. Similarly, the trailing edge receive buffer receives and buffers the received data signal in response to the trailing edge of the receive clock signal and provides the received data signal as a trailing edge received data signal at the next leading edge of the received clock signal. Thus, the receiver circuit provides, as the leading and trailing edge received data signals, at the leading edge of the receive clock signal, the digital data buffered by the both the leading and trailing edge buffers of the transmitter circuit in response to the leading edge of the clock signal.

In a further aspect, the invention in one embodiment provides a continuity test arrangement for testing the continuity of the differential signal wires during a continuity test operation. To accommodate the continuity test, the receiver circuit's differential receiver is provided with a termination resistor and a continuity test circuit. The differential receiver has a plurality of inputs each for connection to one of the differential communication link wires, and generates a single-ended signal representative of digital data in response to differential signals transmitted over the wires. The termination resistor is connected between the differential receiver inputs. The continuity test circuit applies a test voltage to one of the differential receiver inputs during the link test operation. The digital receiver generates the single ended signal representative of digital data of the correct value if the wires are continuous between the transmitter circuit and the receiver circuit, and representative of the incorrect value if at least one of the wires is not continuous therebetween.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
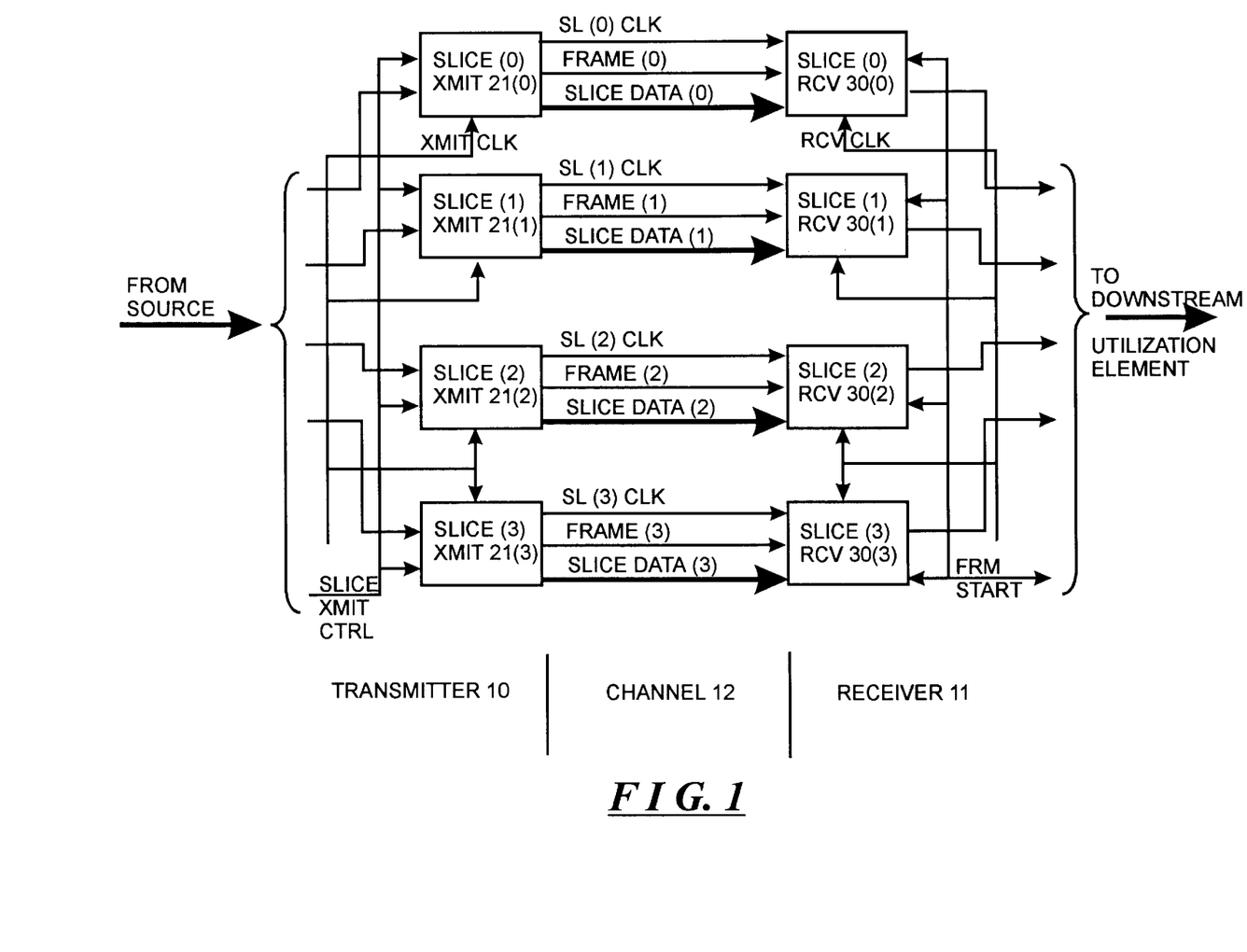
FIG. 1 is a functional block diagram of a digital communications system constructed in accordance with the invention for transferring packets from a digital information source to a destination.

FIG. 1 is a functional block diagram of a digital communications system including driver and receiver circuits constructed in accordance with the invention. The digital communications system 10 transfers information from a digital information source, such as transmitter 10, to a destination, such as receiver 11, over a channel 12. The transmitter 10 and receiver 11 may be associated with any source, in the case of transmitter 10, or user, in the case of receiver 11, of digital information, such as digital data processing systems and the like. Generally, the transmitter 10 transmits, and the receiver 11 receives, information in the form of packets, each packet including one or more successive words, with each word comprising a plurality of bits. For each packet, the bits comprising each word are transferred (that is, transmitted by the transmitter 10 and received by the receiver 11) in parallel over respective communication links comprising the channel 12, and successive words of the packet are transferred serially.

With reference to FIG. 1, the transmitter 10 includes a plurality of slice transmitter circuits 21(0) through 21(3) (generally identified by reference numeral 21(i)), which receive, from a source (not shown) successive words comprising packets to be transmitted to the receiver. Each word to be transmitted comprises a plurality of bits, and each of the slice transmitter circuits 21(i) receives selected ones of the bits from each word. In one embodiment, each word comprises forty bits, with each slice transmitter circuit 21(i) receiving ten of the bits from each word. In addition, each slice transmitter circuit 21(i) receives SLICE XMIT CTRL slice transmit control signals and an XMIT CLK transmit clock, which enables the slice transmitter circuits 21(i) to receive the respective slices of the successive words of each packet from the source and transmit them as respective SLICE DATA(0) through SLICE DATA(3) slice data signals (generally identified as "SLICE DATA (i)" signals) over respective communication links of the channel 12. In addition, each slice transmitter circuit 21(i) provides a respective SL (i) CLK slice (i) clock signal and FRAME (i) frame signal. As will be described below in connection with FIG. 2, the receiver 11 can use the SL (i) CLK slice (i) clock signals from the respective slice transmitter circuits 21(i) to control the latching of the respective SLICE DATA (i) slice data signals, and the FRAME (i) frame signal to identify the beginning and end of the data slice represented by the respective SLICE DATA (i) signal for each packet.

The receiver 11 receives the respective SLICE DATA (i) slice data signals, FRAME(i) frame (i) signals and SL (i) CLK slice clock signals from the respective communication links comprising channel 12 and in response aggregates the successive data slices defined by the SLICE DATA (i) slice data signals into successive words of a packet. The receiver 11 includes a plurality of slice receive circuits 30(0) through 30(3) (generally identified by reference numeral 30(i)). Each of the slice receive circuits 30(i) is connected to respective communication links of the channel 12 to receive the correspondingly-indexed SLICE DATA(i) slice data signals, FRAME (i) frame signal and SL (i) CLK slice (i) clock signal, and, as described in the aforementioned Cassiday patent application, includes buffering for buffering successive slices of a packet. The slice receive circuits 30(i) will transfer the respective successive data slices for a particular packet to the downstream circuitry in synchrony. That is, for a packet comprising "N+1" words from word "0" to word "N" (generally, "word "n""), the slice receive circuits 30(i) will transfer their respective data slices for word "n" to downstream utilization elements when all of them (that is, the slice receive circuits) have received their respective data slices for word "n." In one embodiment, the SLICE DATA (i) slice data signals and FRAME (i) frame (i) signals are all transmitted in synchrony with their respective SL (i) CLK slice (i) clock signal, in which case they may somewhat be out of phase; in that embodiment, the slice receive circuits 30(i) will jointly determine when all of them have received their respective FRAME (i) frame signals for a particular packet, at which point it can enable data slices to be transferred from the respective slice receive circuits 30(i) to the downstream utilization element in parallel.

Figure 2:
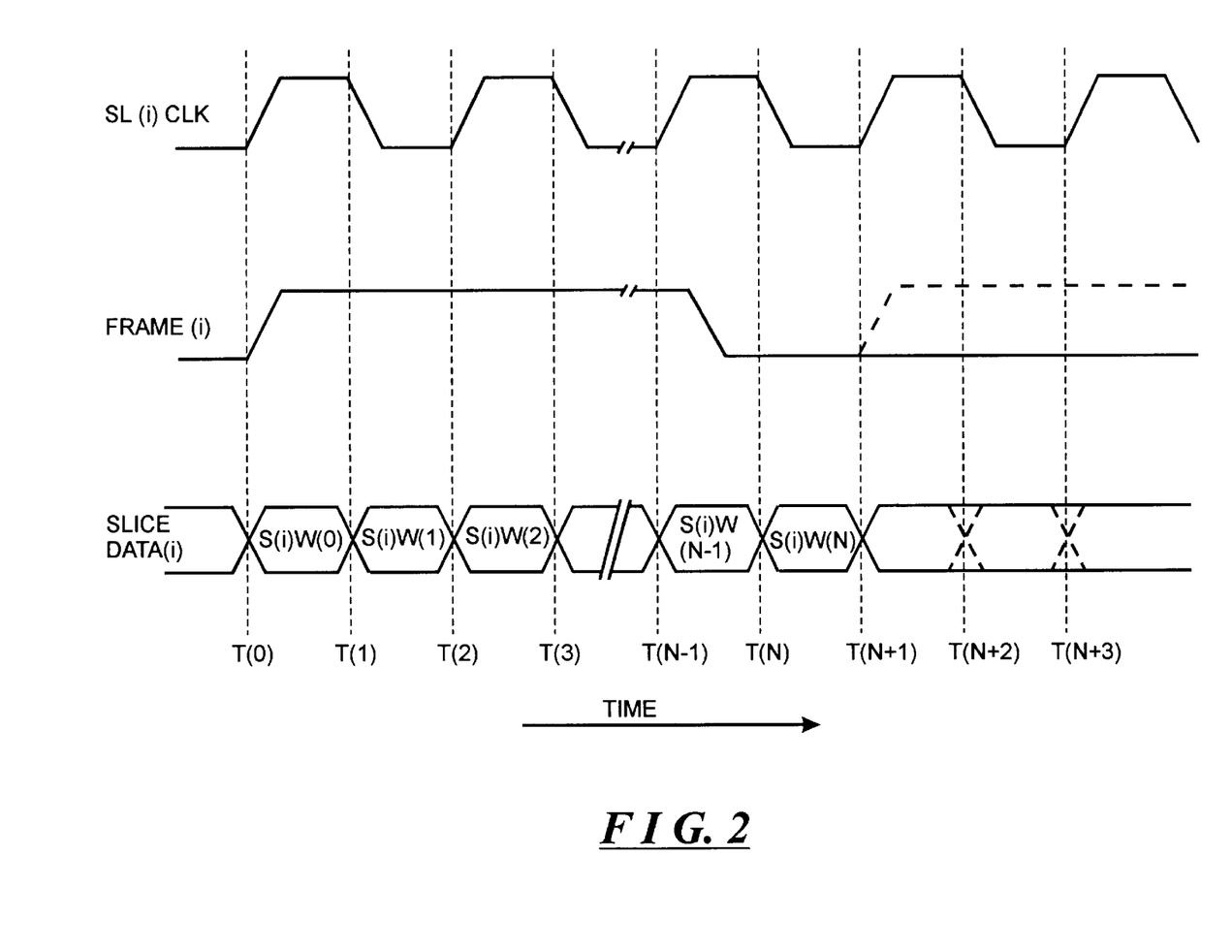
FIG. 2 is a timing diagram useful in understanding the timing of signals transferred between the transmitter and receiver in the digital communications system depicted in FIG. 1.

Before proceeding further, it would be helpful to understand the timing relationships among various SLICE DATA (i) slice data, SL(i) CLK slice (i) clock, and FRAME(i) frame (i) signals transmitted by each slice transmitter circuit 21(i) to the correspondingly-indexed slice receive circuit 30(i). FIG. 2 depicts a timing diagram illustrating these timing relationships. With reference to FIG. 2, the SL (i) CLK slice (i) clock signal is a periodic signal defined by a leading (that is, positive-going) edge at times T(0), T(2), and so forth, and a trailing (that is, negative-going) edge at times T(1), T(3), and so forth between therebetween. Each slice transmitter circuit 21(i) transmits its respective SL (i) CLK slice (i) clock signal continually over the respective communication link of the channel 12 (FIG. 1).

The FRAME (i) frame signal transmitted by a slice transmitter circuit 21(i) defines the beginning and end of the slice transmitter circuit's respective slices for the successive words for a packet, the slice transmitter circuits slices being represented by SLICE (i) DATA slice (i) data signals which define successive S(i)W(0) through S(i)W(N) slice (i) word (n) data items (generally identified by abbreviation "S(i)W (n)") for an N+1 word packet. As shown at time T(0) in FIG. 2, the FRAME (i) frame signal is asserted (that is, it has a leading edge) concurrently with the leading edge of the SL (i) CLK slice (i) clock signal, to indicate that the SLICE (i)

DATA slice (i) data signals transmitted by the slice transmitter circuit 21(i) at that point define the S(i)W(0) slice (i) word (0) data item that forms the beginning of a packet. Concurrently with the assertion of the FRAME(i) frame signal at time T(0), and concurrently with subsequent trailing and leading edges of the SL(i) CLK slice (i) clock signal at times T(1) through T(N), the slice transmitter circuit 21(i) will transmit SLICE (i) DATA slice (i) data signals which define successive S(i)W(n) slice (i) word (n) data items of respective words of the packet. Between time T(N−1) and time T(N), the slice transmitter circuit 21(i) will negate the FRAME(i) frame (i) signal, to indicate that the slice defined by the SLICE (i) DATA slice data signals transmitted concurrently with the next edge of the SL (i) CLK slice (i) clock signal, namely, the slice transmitted at time T(N) is the last word for the packet. In the illustration depicted in FIG. 2, time T(N) at which the S(i)W(N) slice (i) word (N) data item defining the last word to be transmitted for the packet corresponds to a trailing edge of the SL(i) CLK slice (i) clock, but it will be appreciated that the S(i)W(N) slice (i) word (N) data item may instead be transmitted on the leading edge if there are an odd number of words to be transmitted for the packet.

The slice receive circuit 30(i) will use edges of the SL (i) CLK slice (i) clock signal to control the receiving and subsequent processing of the FRAME(I) frame (i) signal and the SLICE (i) DATA slice (i) data signals defining the S(i)W(n) slice (i) word (n) data items. Thus, the slice transmitter circuit 21(i) can negate the FRAME(I) frame signal ahead of time T(N) so that the slice receive circuit 30(i) will note it as being negated at time T(N). The FRAME (i) frame (i) signal can thus be asserted at time T(N+1), as indicated by the dashed line associated with the FRAME(i) frame (i) signal, to indicate the beginning of a subsequent packet, beginning with S(i)W(0) data item (not shown) beginning at time T(N+1) for the subsequent packet. This allows S(i)W(n) data items for successive packets to follow one another without interruption.

Figure 3:
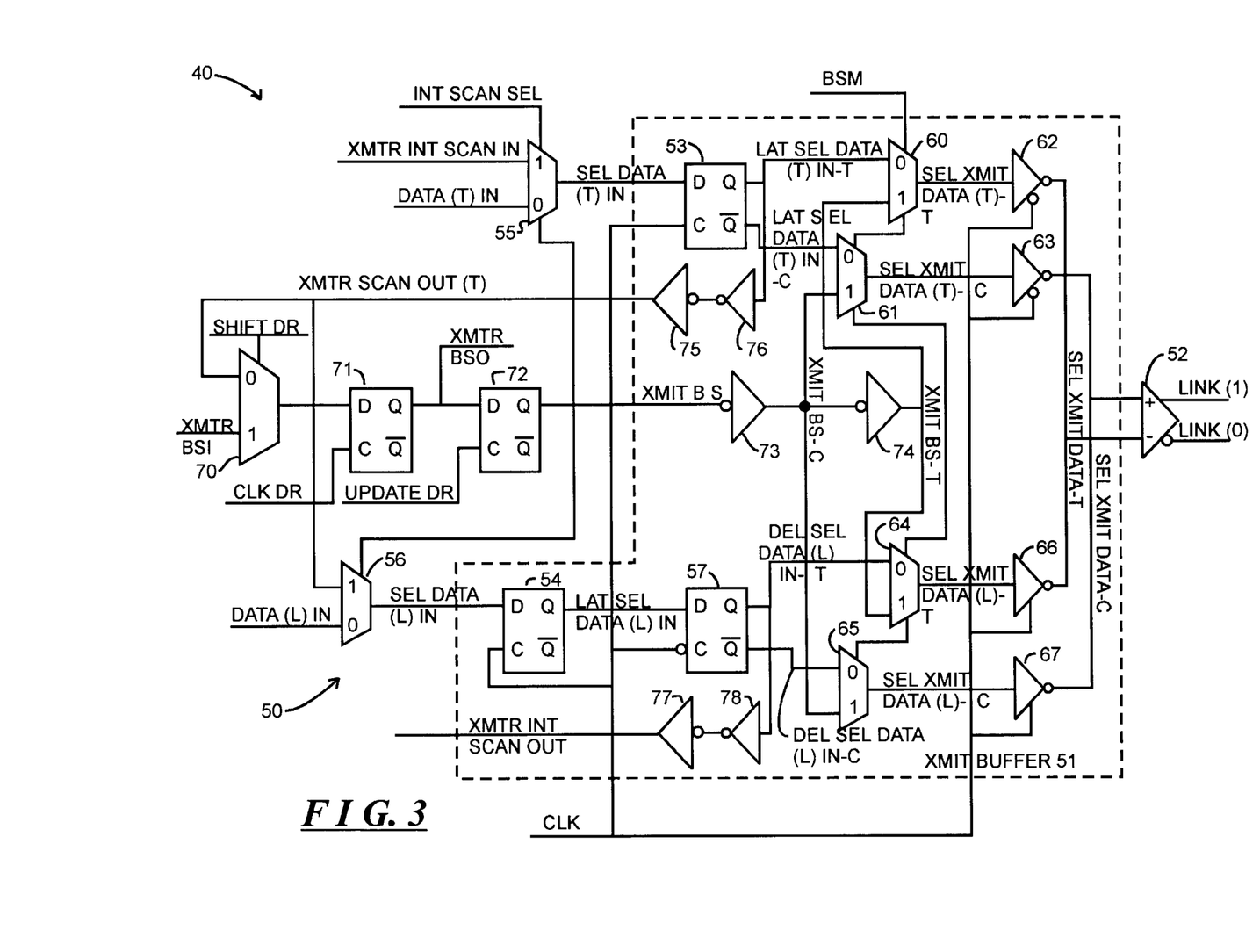
FIG. 3 is a schematic logic diagram of a transmitter circuit useful in the digital communications system depicted in FIG. 1.
Figure 4:
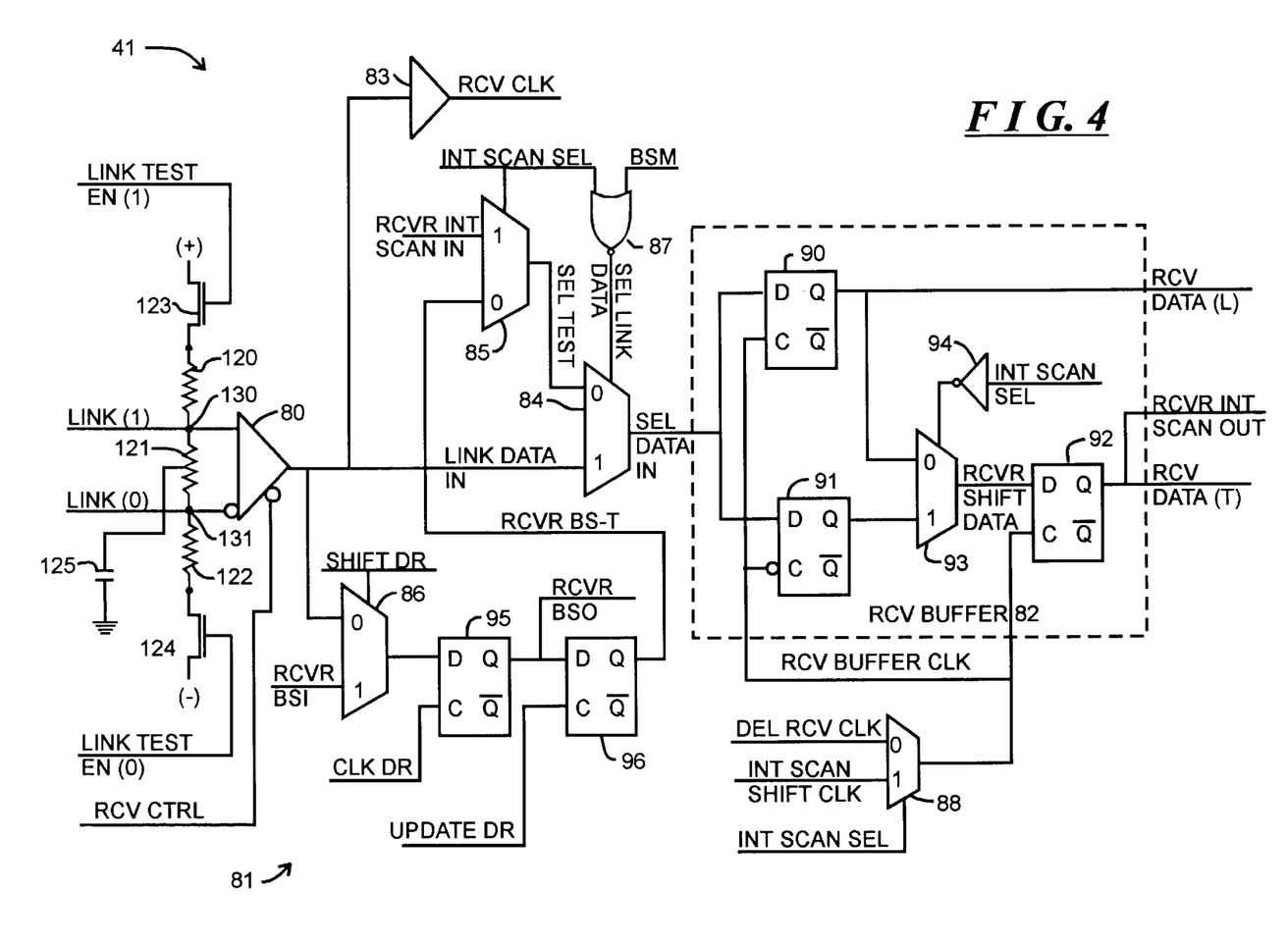
FIG. 4 is a schematic logic diagram of a receiver circuit useful in the digital communications system depicted in FIG. 1.

As noted above, and as described in the aforementioned Cassiday patent application, each slice transmitter circuit 21(i) transmits, and each slice receiver circuit 30(i) receives, a plurality of signals, including the SL(i) CLK slice (i) clock, FRAME (i) frame (i) and a plurality of SLICE (i) DATA slice data signals, with the "b-th" SLICE (i) DATA slice data signal defining the "b-th" data bit of each S(i)W(N) slice (i) word (n) data item transferred from the slice transmitter circuit 21(i) to the slice receiver circuit 30(i). In one embodiment, each of the signals is in the form of a differential signal, which is defined by the difference in voltage levels on two lines which comprises a unitary link interconnecting the slice transmitter circuit 21(i) and slice receiver circuit 30(i). One transmitter circuit 40, which transmits one of the signals, is depicted in FIG. 3, and one receiver circuit 41, which is used by a slice receiver circuit 30 in receiving one of the signals, is depicted in FIG. 4. The transmitter circuit 40 and receiver circuit 41 as depicted in FIGS. 3 and 4 can be used as circuit cell structures that can be instantiated and used in fabricating the digital communications system.

As will be described below in connection with FIGS. 3 and 4, the SL (i) CLK slice (i) clock and FRAME (i) frame (i) signals are transmitted and received using the same transmitter and receiver circuits 40 and 41 as are used in connection with transmission and reception of the SLICE (i) DATA slice data signals, which will minimize any skew that may develop in connection with the transfer of the information from the slice transmitter circuit 21(i) to the respective work receiver circuit 30(i). Generally, the transmitter circuit 40 and the receiver circuit 41 operate in a plurality of operational modes, including a normal operating mode and a plurality of test modes. In the normal operating mode, the transmitter circuit 40 transmits information to receiver circuit 41 during normal operation of the digital communications system (FIG. 1). During the test modes, information is transferred for diagnostic or test purposes. In a boundary scan test mode, predetermined information, in the form of a boundary scan test vector, is transferred to test the operation of various drivers and receivers that form part of the information transfer path for the transmitter circuit 40 and receiver circuit 41. The result of the transfer, namely, a boundary scan result vector, is retrieved and compared to an expected boundary scan result vector, to determine the operational condition of the portion of the digital communications system through which the boundary scan test vector is transferred. Similarly, in an internal scan test mode, information in the form of an internal scan test vector is loaded in predetermined circuits of the digital communications system and processed to form an internal scan result vector, which is retrieved and compared to an expected internal scan result vector, to determine the operational condition of the respective portion of the digital communications system. Finally, in a link test mode, the receiver circuit 41 can determine the condition of signal wires interconnecting it and the transmitter circuit 40.

With reference to FIG. 3, the transmitter circuit 40 includes an input control circuit 50, a transmit buffer circuit 51 and a differential transmitter circuit 52. Generally, the input control circuit 50 controls the information coupled to the transmit buffer circuit 51 for transmission. The transmit buffer circuit 51, in turn, buffers the information that is provided by the input control circuit 50 prior to transmission, and the differential driver circuit 52 transmits the buffered information provided thereto by the transmit buffer circuit 51 over the respective wires LINK (1) and LINK (0) forming the unitary link interconnecting the slice transmitter circuit 21(i) and the slice receiver circuit 30(i). The transmitter circuit 40 receives information from three sources, including circuitry (not shown) which provides information for transmission to the receiver circuit 41 during the normal operating mode, circuitry (also not shown) which provides information to the transmit buffer circuit 51 during the boundary scan test mode, and circuitry (also not shown) which provides information to the transmit buffer circuit 51 during the internal scan test mode.

As described above in connection with FIG. 2, each slice transmitter circuit 21(i) transmits information concurrently with both the leading edge and the trailing edge of the SL (i) CLK slice (i) clock signal. Contemporaneously with the leading edge of an internal CLK clock signal provided by a clock signal source (not shown) associated with the slice transmitter circuit 21(i), the transmit buffer circuit 51 of the transmitter circuit 40 receives two bits of information to be transmitted, namely, the bit to be transmitted concurrently with the leading edge of the SL (i) CLK slice (i) clock signal as well as the bit to be transmitted concurrently with the trailing edge of the SL (i) CLK slice (i) clock signal. The CLK clock signal also controls a multiplexer in the buffer circuit 51 that couples the bits to the differential transmitter 52 for transmission contemporaneous with the next trailing and leading edges of the CLK signal. For the transmitter circuit 40 that transmits the SL (i) CLK slice (i) clock signal, the information received by the transmitter circuit 40 effectively enables the transmitter circuit to provide leading and trailing edges of the SL (i) CLK signal contemporaneous with the leading and trailing edges of the CLK clock signal.

More particularly, and with reference to FIG. 3, the transmit buffer circuit 51 includes two input flip-flops 53 and 54 which receive information bits to be transmitted from respective input multiplexers 55 and 56. If an INT SCAN SEL transmitter internal scan select signal is not asserted, which will be the case during the normal operating mode, while the transmitter circuit 40 is transmitting a SL (i) CLK slice (i) clock, FRAME(i) frame (i) or SLICE (i) DATA slice data signal, the multiplexers 55 and 56 will couple respective DATA (T) IN data (trailing) in and DATA (L) IN data (leading) in signals from the respective source. If the transmitter circuit 40 is to be used to transmit a bit of the SLICE (i) DATA signals, the DATA (T) IN and DATA (L) IN signals may be provided by, for example, a memory or other source of data for the respective slice of the packet being transferred by the slice transmitter circuit 21 (i) which contains the transmitter circuit 40. On the other hand, if the transmitter circuit 40 is to be used to transmit the FRAME (i) frame (i) signal, the DATA (T) IN and DATA (L) IN signals may be provided by a protocol signal generating circuit (not shown) which identifies the beginning and end of a packet being transferred and provides DATA (T) IN and DATA (L) IN signals to enable the FRAME (i) signal to be generated as described above.

Finally, if the transmitter circuit 40 is to be used to transmit the SL(i) CLK slice (i) clock signal, the DATA (T) IN data (trailing) in signal will be continually maintained at a negated level, whereas the DATA (L) IN data (leading) in signal will be continually maintained at an asserted level. As will be described below, by maintaining the DATA (T) IN and DATA (L) IN signals at these levels, the SL (i) CLK slice (i) clock signal will have the pattern described above in connection with FIG. 2. In addition, by using a transmitter circuit to transmit the SL (i) CLK slice (i) clock which has the same structure as the transmitter circuits which are used to transmit the FRAME (i) frame (i) and SL (i) DATA slice (i) data signals, skew between the SL (i) CLK slice (i) clock signal and the FRAME (i) and SL (i) DATA slice (i) data signals transmitted by the other transmitter circuits of the word transmit circuit 21 (i) will be minimized.

Thus, while the INT SCAN SEL transmitter internal scan select signal is negated, multiplexers 55 and 56 will couple the respective DATA (T) IN data (trailing) in and DATA (L) IN data (leading) in signals as respective SEL DATA (T) selected data (trailing) and SEL DATA (L) selected data (leading) signals to respective data input terminals of flip-flops 53 and 54. On the leading edge of the CLK clock signal, (that is, when the CLK clock signal transitions from the negated condition to the asserted condition), the flip-flops 53 and 54 will latch the respective SEL DATA (T) selected data (trailing) and SEL DATA (L) selected data (leading) signals.

After latching the SEL DATA (T) selected data (trailing) signal in response to the assertion of the CLK clock signal, the flip-flop 53 provides a LAT SEL DATA (T)-T latched selected data (trailing)-true signal to one input of a multiplexer 60 and complementary LAT SEL DATA (T)-C latched selected data (trailing)-complement signal to one input of a multiplexer 61. While a BSM boundary scan multiplexer control signal is negated, which will be the case other than during the boundary scan test mode, the multiplexers 60 and 61 couple the respective true and complement LAT SEL DATA (T)-T and LAT SEL DATA (T)-C signals as SEL_XMIT_DATA (T)-T selected transmit data (trailing)-true and SEL_XMIT_DATA (T)-C selected transmit data (trailing)-complement signals to respective gated drivers 62 and 63.

While the CLK clock signal remains asserted, the gated drivers 62 and 63 will block transfer of the LAT SEL DATA (T)-T and LAT SEL DATA (T)-C signals to respective terminals of the differential driver circuit 52. However, contemporaneous with the trailing edge of the CLK clock signal, that is, the transition of the CLK clock signal from the asserted condition to the negated condition, and while the CLK signal remains negated thereafter, the gated drivers 62 and 63 will couple the SEL_XMIT_DATA (T)-T and SEL_XMIT_DATA (T)-C true and complement selected transmit data (trailing) signals to the differential driver circuit 52, which, in turn, will couple them as over the differential signal wires LINK (1) and LINK (0) connecting the transmitter circuit 40 to the receiver circuit 41.

Returning to flip-flop 54, after that flip-flop stores the SEL DATA (L) selected data (leading) signal in response to the assertion of the CLK signal as described above, it provides a LAT SEL DATA (L) latched selected data (leading) to a flip-flop 57. When the CLK clock signal transitions from the asserted condition to the negated condition at its trailing edge, the flip-flop 57 to stores the LAT SEL DATA (L) latched selected data (leading) signal. The flip-flop 57, in turn, will provide a DEL LAT SEL DATA (L)-T delayed latched selected data (leading)-true signal to one input of a multiplexer 64, and a complementary DEL LAT SEL DATA (L)-C delayed latched selected data (leading)-complement signal to one input of a multiplexer 65.

While the transmitter circuit 40 is not operating in the boundary scan test mode, the negated BSM boundary scan multiplexer control signal controls the multiplexers 64 and 65 couple the respective true and complement DEL LAT SEL DATA (L)-T and DEL LAT SEL DATA (L)-C signals as SEL_XMIT_DATA (L)-T selected transmit data (leading)-true and SEL_XMIT_DATA (L)-C selected transmit data (leading)-complement signals to respective gated drivers 66 and 67.

While the CLK clock signal remains negated, the gated drivers 66 and 67 will block transfer of the SEL_XMIT_DATA (L)-T and SEL_XMIT_DATA (L)-C signals to respective terminals of the differential driver circuit 52. However, contemporaneous with the leading edge of the CLK clock signal, that is, a transition of the CLK clock signal from the negated condition to the asserted condition, and while the CLK signal remains asserted thereafter, the gated drivers 66 and 67 will couple the SEL_XMIT_DATA (T)-T and SEL_XMIT_DATA (T)-C true and complement selected transmit data (trailing) signals to the differential driver circuit 52, which, in turn, will couple them as over the differential signal wires LINK (1) and LINK (0) connecting the transmitter circuit 40 to the receiver circuit 41.

It will be appreciated that the gated drivers 62, 63, 66 and 67 effectively form a multiplexer that, during normal operation of the transmitter circuit 40 selectively couples signals from flip-flop 53 or 57 to the differential driver 52 during respective portions of the cycle of the CLK clock signal. In particular, during the portion of the CLK clock signal's cycle during which it (that is, the CLK clock signal) is asserted, the multiplexer formed by gated drivers 62, 63, 66 and 67 couples signals from the flip-flop 57 to the differential driver 52, and blocks signals from the flip-flop 53, during the portion of the CLK clock signal's cycle during which it (that is, the CLK clock signal) is asserted. On the other hand, during the portion of the CLK clock signal's cycle during which it (that is, the CLK clock signal) is negated, the multiplexer formed by gated drivers 62, 63, 66 and 67 couples signals from the flip-flop 53 to the differential driver 52, and blocks signals from the flip-flop 57, during the portion of the CLK clock signal's cycle during which it (that is, the CLK signal) is negated.

The operations described above will continue through successive periods of the CLK clock signal. Accordingly:

(A) At the leading edge of the CLK clock signal, when the CLK signal transitions from the negated condition to the asserted condition:
  (i) the gated drivers 62 and 63 are disabled, thereby to block transmission of the contents of flip-flop 53 by the differential driver 52;
  (ii) gated drivers 66 and 67 are enabled, thereby to couple the contents of flip-flop 57 to differential driver 52 for transmission;
  (iii) the flip-flop 53 latches the SEL DATA (T) IN selected data (trailing) in signal from multiplexer 55; and
  (iv) the flip-flop 54 stores the SEL DATA (L) IN selected data (leading) in signal from multiplexer 56.

(B) While the CLK clock signal remains in the asserted condition:
  (i) the gated drivers 62 and 63 remain disabled, thereby to continue blocking transmission of the contents of flip-flop 53 by the differential driver 52; and
  (ii) the gated drivers 66 and 67 remain enabled, thereby to continue coupling the contents of flip-flop 57 to differential driver 52 for transmission.

(C) At the trailing edge of the CLK signal, when the CLK signal transitions from the asserted condition to the negated condition:
  (i) the gated drivers 66 and 67 are disabled, thereby to terminate coupling of the contents of the flip-flop 57 to the differential driver 52;
  (ii) the gated drivers 62 and 63 are enabled, thereby to couple the contents of flip-flop 53 to the differential driver 52 for transmission; and
  (iii) the flip-flop 57 latches the signal provided thereto by flip-flop 54 (which signal will be coupled to differential driver 52 when the CLK signal is next asserted, reference item (A)(ii) above).

(D) While the CLK clock signal remains in the negated condition:
  (i) the gated drivers 62 and 63 remain enabled, thereby to continue coupling of the contents of the flip-flop 53 to the differential driver 52 for transmission; and
  (ii) the gated drivers 66 and 67 remain disabled, thereby to continue blocking transmission of the contents of flip-flop 57 by the differential driver 52.

It will be appreciated from the above that, for the signals latched in respective flip-flops 53 and 54 when the CLK clock signal is asserted at time "t":
  (i) the signal that is latched in flip-flop 53 at time "t" will be transmitted by the differential driver 52 contemporaneous with the trailing edge of the CLK signal's cycle immediately following time "t" and while it (that is, the CLK clock signal) remains in the negated condition, and
  (ii) the signal that is latched in flip-flop 54 at time "t" will be copied into flip-flop 57 contemporaneous with the trailing edge of the CLK signal following time "t," and will be transmitted by the differential driver 52 contemporaneous with the leading edge of the CLK signal at time "t+1" and while it (that is, the CLK clock signal) remains in the asserted condition.

Thus, each of the flip-flops 53 and 57 will latch its respective signal one-half cycle of the CLK signal before the CLK clock signal enables the respective set of gated drivers 62, 63 and 66, 67 to couple the signals therefrom to the differential driver 52 for transmission. This one-half cycle delay is provided to allow sufficient time for signals provided by the respective flip-flops 53 and 57 to propagate and settle at the inputs to the respective gated drivers 63, 63, 66, 67, which, in turn, minimizes the delay in providing the respective signals to the differential driver 52 for transmission, and in addition will minimize any variation in such delay as among the transmitter circuits 40 for the respective signals transmitted by the slice transmitter circuit 21(i).

As described above, the transmitter circuit 40 for transmitting the SL (i) CLK slice (i) clock signal has the same structure as that shown on FIG. 3. For the transmitter circuit 40 for transmitting the SL (i) CLK slice (i) clock signal, the DATA (T) IN data (trailing) in signal provided to multiplexer 55 is maintained at a negated level, and the DATA (L) IN data (leading) in signal is maintained at an asserted level. In that condition, during normal operation of the transmitter circuit 40, the INT SCAN SEL signal will enable the multiplexers 55 and 56 to couple the respective DATA (T) IN data (trailing) in and DATA (L) IN data (leading) in signals to the respective flip-flops 53 and 54, as described above. In this case, however, the respective signals will continually be negated (in the case of the DATA (T) IN data (trailing) in signal) or asserted (in the case of the DATA (L) IN data (leading) in signal). Thus, the signal stored by the flip-flops 54 and 57 will be continually maintained in the asserted condition, and so the DEL SEL DATA (L)-T delayed selected data (leading) true and SEL_XMIT_ DATA (L)-T selected transmit data leading -true signals will be continually maintained in the asserted condition. Contrariwise, the complement DEL SEL DATA (L)-C delayed selected data (leading)-complement and SEL_ XMIT_DATA (L)-C selected transmit data leading-complement signals will be continually maintained in the negated condition. In this condition, at the leading edge of the CLK clock signal, that is, when it (that is, the CLK clock signal) shifts to the asserted condition, the gated drivers 66 and 67 will couple the respective asserted true SEL_ XMIT_DATA (L)-T selected transmit data (leading)-true and negated complement SEL_XMIT_DATA (L)-C selected transmit data leading-complement signals to the differential driver 52. Since the assertion of the CLK clock signal also turns off the gated drivers 62 and 63, the signals provided the gated drivers 66 and 67 will enable the differential driver to transmit an asserted SL (i) CLK slice (i) clock onto the differential signal wires connected thereto. The gated drivers 62, 63, 66 and 67 will enable the differential driver 52 to maintain the SL (i) CLK slice (i) clock signal on the differential signal wires LINK (1) and LINK (0) in the asserted condition while the CLK clock signal is asserted.

On the other hand, the signal stored by the flip-flop 53 will be continually maintained in the negated condition, and so the SEL DATA (T)-T selected data (trailing)-true and SEL_ XMIT_DATA (T)-T selected transmit data trailing-true signals will be continually maintained in the negated condition. Contrariwise, the complement SEL DATA (T)-C delayed selected data (trailing)complement and SEL_XMIT_ DATA (T)-C selected transmit data trailing-complement signals will be continually maintained in the asserted condition. In this condition, at the trailing edge of the CLK clock signal, that is, when it (that is, the CLK clock signal) shifts to the negated condition, the gated drivers 62 and 63 will couple the respective asserted true SEL_XMIT_DATA (T)-T selected transmit data (trailing)-true and negated complement SEL_XMIT_DATA (T)-C selected transmit data (trailing)-complement signals to the differential driver 52. Since the negation of the CLK clock signal also turns off the gated drivers 66 and 67, the signals provided the gated drivers 62 and 63 will enable the differential driver to transmit a negated SL (i) CLK slice (i) clock onto the differential signal wires connected thereto. The gated drivers 62, 63, 66 and 67 will enable the differential driver 52 to maintain the SL (i) CLK slice (i) clock signal on the differential signal wires LINK (1) and LINK (0) in the negated condition while the CLK clock signal is negated. Thus, the leading and trailing edges of the SL (i) CLK slice (i) clock signal corresponds to the leading and trailing edges of the CLK signal.

The receiver circuit 41 used in the slice receiver circuit 30 is depicted in FIG. 4. With reference to FIG. 4, the receiver circuit 41 includes a differential receiver 80, an input select circuit 81 and a receive buffer circuit 82. The differential receiver circuit 80 is connected to receive the differential signal from the LINK (1) and LINK (0) wires transmitted by the differential driver 52 of the transmitter circuit 40 connected thereto. In response, and if a RCV_CTRL receive control signal is negated the differential receiver circuit 80 generates a single-ended LINK DATA IN signal. The differential receiver circuit 80 has a predetermined hysteresis characteristic so as to provide the LINK DATA IN signal with suitable leading and trailing edges in response to the complementary changes in the voltage levels defining the differential signal on the LINK (1) and LINK (0) wires; in particular, the differential receiver circuit 80 provides, for example, a leading edge for the LINK DATA IN signal when the voltage difference between the LINK (1) wire and LINK (0) wire reaches a predetermined positive level, and a trailing edge when the voltage level reaches a corresponding negative level.

The differential receiver 80 provides the LINK DATA IN signal to several components in the input select circuit 81, including a receive clock buffer circuit 83 and multiplexers 84 and 86. The receive clock buffer circuit 83 provides a RCV_CLK receive clock signal, which, if the receiver circuit 41 is connected to receive the SL (i) CLK slice (i) clock signal, is distributed to the other receiver circuits of the slice receiver circuit 30(i) to control reception by them of the FRAME (i) frame (i) and SLICE (i) DATA slice data signals, as described in the aforementioned Cassiday patent application. The RCV_CLK receive clock signal will follow the same assertion and negation pattern and timing as the SL (i) CLK slice (i) clock signal, which, in turn, corresponds to the same assertion and negation pattern and timing as the CLK signal of the transmit circuit 40 which generated the SL (i) CLK slice (i) clock signal (ignoring propagation delays across comprising wires LINK (1) and LINK (0)).

For the receiver circuits 41 of the slice receive circuit 30 which receive the other signals, namely, the FRAME (i) and SLICE (i) DATA signals, while an INT SCAN SEL internal scan select signal and the BSM boundary scan multiplexer control signal are both negated, a NAND gate 87 will assert a SEL LINK DATA select link data signal, which, in turn, enables multiplexer 84 to couple the LINK DATA IN signal to the receive buffer 82 as a SEL DATA IN selected data in signal. Both the INT SCAN SEL internal scan select and the BSM boundary scan multiplexer control signals will be negated during normal operation of the receiver circuit 41, that is, when data is being transferred between the respective slice transmit and slice receiver circuits 21(i) and 30(i) (FIG. 1). The receive buffer 82 receives and latches the SEL DATA IN selected data in signal in response to both the leading and trailing edges of a DEL_RCV_CLK delayed receive clock signal. As described in the aforementioned Cassiday patent application, the DEL_RCV_CLK delayed receive clock signal is generated by a delay circuit (not shown) in the slice receive circuit 30. The leading and trailing edges of the DEL_RCV_CLK delayed receive clock signal are delayed from the corresponding edges of the RCV_CLK receive clock by an amount of time required to allow the SEL DATA IN selected data in signal to settle at the inputs of the circuitry in the receive buffer 82, as described below.

The receive buffer 82 comprises flip-flops 90, 91 and 92, a multiplexer 93 and an inverter 94. The flip-flop 90 is connected to latch the SEL DATA IN selected data in signal on the leading edge of the DEL_RCV_CLK delayed receive clock signal, which is coupled to the flip-flop 90 by a multiplexer 88 as a RCV_BUFFER_CLK receive buffer clock signal while the INT SCAN SEL internal scan selected mode signal is not asserted. As noted above, the INT SCAN SEL signal will be negated while the receiver circuit 41 is operating in the normal operating mode. The flip-flop 90, in turn, provides a RCV_DATA (L) receive data (leading) signal representative of the latched SEL DATA IN signal to downstream circuitry (not shown). As described in the aforementioned Cassiday patent application, downstream circuitry used in one embodiment of the slice receive circuit 30(i) includes (i) for the receiver circuits 41 which receive the SLICE (i) DATA signals, a FIFO buffer for storing bits comprising the successive words of a packet, and (ii) for the receiver circuit 41 which receives the FRAME (i) frame (i) signal, a circuit for using the FRAME (i) signal to identify the beginning and end of a packet and control the storage of the packet in the FIFO.

It will be appreciated that the SEL DATA IN signal at the leading edge of the DEL_RCV_CLK delayed receive clock signal represents a data bit provided by the flip-flop 57 (FIG. 3) as described above.

On the other hand, the flip-flop 91 is connected to latch the SEL DATA IN selected data in signal on the trailing edge of the DEL_RCV_CLK delayed receive clock signal. It will be appreciated that the SEL DATA IN signal at that point represents a data bit as provided by the flip-flop 53 for transmission over the differential signal wires LINK(1) and LINK(0) as described above. The flip-flop 91 will provide the latched SEL DATA IN signal as a LAT SEL DATA IN latched selected data in signal to one input of the multiplexer 93. If the INT SCAN SEL internal scan select signal is not asserted, which will be the case while the receiver circuit 41 is operating in the normal operating mode, the inverter 94 enables the multiplexer 93 to couple the LAT SEL DATA IN signal as a SEL_RCV_DATA selected receive data signal to flip-flop 92. Flip-flop 92, in turn, latches the SEL_RCV_DATA signal at the next leading edge of the DEL_RCV_CLK delayed receive clock signal, and couples the latched signal as a RCV_DATA (T) receive data (trailing) signal to the downstream circuitry (not shown).

It will be appreciated that the RCV_DATA (L) receive data (leading) and RCV_DATA (T) receive data (trailing) signals which are contemporaneously latched in the flip-flops 90 and 92 of the receive circuit 41 (FIG. 4) in response to the leading edge of the DEL_RCV_CLK delayed receive clock signal, represent bits that correspond to the pair of bits represented by the DATA (L) IN data (leading) in and DATA (T) IN data (trailing) in signals which are contemporaneously latched in the flip-flops 53 and 54 of the transmit circuit 40 (FIG. 3) in response to the leading edge of the CLK signal. This follows from the facts that (i) there are three flip-flops, namely, flip-flops 54, 57 and 90, in the path from the input to the transmit circuit 40 (that is, at multiplexer 56) to the output from the receiver circuit 41 (that is, the output of flip-flop 90) for the bit transferred at the leading edge of the transmit circuit's CLK signal, (ii) there are also three flip-flops, namely, flip-flops 53, 91 and 92, in the path from the input to the transmit circuit 40 (that is, at multiplexer 55) to the output from the receiver circuit 41 (that is, the output of flip-flop 92) for the bit transferred at the trailing edge of the transmit circuit's CLK signal, and (iii) the leading and trailing edges of the slice transmitter circuit's CLK correspond to the leading edge and trailing edges of the SL (i) CLK slice (i) clock signal and thus the leading and trailing edges of the RCV_CLK receive clock signal.

More particularly, as described above, for the signals latched in respective flip-flops 53 and 54 at time "t" of the CLK clock signal:

(i) the signal that is latched in flip-flop 53 at time "t" will be transmitted by the differential driver 52 contemporaneous with the trailing edge of the CLK clock signal immediately following time "t" and while it (that is, the CLK clock signal) remains in the negated condition, and (ii) the signal that is latched in flip-flop 54 at time "t" will be transmitted by the differential driver 52 contemporaneous with the leading edge of the CLK signal at time "t+1" and while it (that is, the CLK clock signal) remains in the asserted condition.

Thus, (iii) the signal transmitted by the transmitter circuit 40 contemporaneous with the trailing edge of the CLK clock signal at time "t" will be received by the receiver circuit 41 and latched by flip-flop 91 contemporaneous with the trailing edge of the DEL_RCV_CLK delayed receive clock signal following time "r", and will be copied to flip-flop 92 contemporaneous with the leading edge of the DEL_RCV_CLK delayed receive clock signal at time "r+1," and (iv) the signal transmitted by the transmitter circuit 40 contemporaneous with the leading edge of the CLK clock signal at time "t+1" will be received by the receiver circuit 41 and latched by flip-flop 90 contemporaneous with the leading edge of the DEL_RCV_CLK delayed receive clock signal at time "r+1."

Thus, bits defined by signals latched by both flip-flops 53 and 54 of the transmitter circuit 40 at time "t," will be latched in both flip-flops 90 and 92 and available to circuitry (not shown) downstream thereof at time "r+1."

As described above, the transmitter circuit 40 and receiver circuit 41 also operate in three test modes, including a boundary scan test mode, an internal scan test mode and a link test mode. Generally, the entire digital communications system (FIG. 1) will be operating in the respective test mode, so that all of the transmitter and receiver circuits 40 and 41 in the slice transmitter and slice receiver circuits 21(i) and 30(i) will be operating in the respective test mode contemporaneously.

In boundary scan test mode, the transmitter circuit 40 and receiver circuit 41 operate to perform a boundary scan test operation, in which a boundary test vector is loaded into selected circuits, clocking signals controlling the slice transmitter circuits 21(i) and slice receiver circuits 30(i), such as the CLK clock signal, are advanced a predetermined number of cycles to generate a boundary test result vector, which is retrieved and studied to determine whether the circuits are operating properly. In one embodiment, the boundary scan test operation is in conformance with the boundary scan described in the IEEE Specification 1149.1. Generally, in the boundary scan test mode, only certain circuits, in particular circuits which generate signals for transmission over the differential signal wires LINK (1) and LINK (0) are tested. Thus, within limitations described below in connection with operations performed during the link test mode, during operations performed while in the boundary scan test mode, the differential signal generation, transfer and receiving circuitry can be tested. Similar operations are performed in the internal scan test mode, but generally in connection with all or a selected large subset of the circuitry comprising the slice transmitter circuits 21(i) and slice receiver circuits 30(i).

With reference to FIG. 3, the transmitter circuit 40 further includes a multiplexer 70, flip-flops 71 and 72 and inverters 73 and 74 for use in connection with a boundary scan test operation while in the boundary scan test mode. In addition, the receiver circuit 41 includes multiplexers 85 and 86 and flip-flops 95 and 96 for use in connection with the boundary scan test operation. While in the boundary scan test mode, as noted above, the boundary scan test vector is initially loaded into the respective flip-flops 71 of the transmitter circuits 40 of the slice transmitter circuits 21(i), and the respective flip-flops 95 of the receiver circuits 41 of the slice receiver circuits 30(i). In that operation, the flip-flops 71 and 86 of the transmitter and receiver circuits 40 and 41 are connected in series to effectively form a shift register, through which the boundary scan test vector is then shifted. To form the shift register, a SHIFT DR shift enable signal controls the multiplexers 70 (FIG. 3) and 86 (FIG. 4) to couple respective XMTR_BSI transmitter boundary scan input and RCVR_BSI receiver boundary scan input signals to the respective flip-flops 71 and 95, which latch them (that is, the respective signals) at leading edges of the CLK DR clock signal. The outputs of the respective flip-flops 71 and 86 are coupled as respective XMTR_BSO and RCVR_BSO transmitter and receiver boundary square output signals to the inputs of flip-flops 72 and 96.

If a flip-flop 71 or 96 is the first flip-flop forming the boundary scan shift register, the respective XMTR_BSI and/or RCVR_BSI signal(s) may be provided by a boundary scan test vector source (not shown) which provides the successive bits comprising the boundary scan test vector as the boundary scan test vector is shifted through the shift register. Alternatively, for the flip-flops 71 and 96 which are not the first flip-flop in the boundary scan shift register, the respective XMTR_BSI and RCVR_BSI signals are provided by respective preceding flip-flops forming the boundary scan shift register through which the boundary scan test vector is shifted. In particular, the XMTR_BSI signal received the multiplexer 70 of a particular transmitter circuit 40 can comprise, for example, the XMTR_BSO signal provided by a flip-flop 71 of another transmitter circuit 40 in a slice transmitter circuit 21(i) in the transmitter 10 (FIG. 1). Similarly, the RCVR_BSI signal received the multiplexer 86 of a particular receiver circuit 41 can comprise, for example, the RCVR_BSO signal provided by a flip-flop 95 of another receiver circuit 40 in a slice receiver circuit 30(i) in the receiver 12 (FIG. 1). Thus, when the SHIFT DR shift signal is asserted to enable the multiplexers 70 and 86 to couple respective XMTR_BSI and RCVR_BSI signals to the inputs of the respective flip-flops 71, since the XMTR_BSI and RCVR_BSI signals correspond to XMTR_BSO and RCVR_BSO signals from respective preceding flip-flops or from a boundary scan test vector source, the flip-flops 71 and 96 form a shift register, as described above, with the successive bits of the boundary scan test vector being shifted through the flip-flops on successive leading edges of the CLK DR clock signal.

After the boundary scan test vector is shifted into the flip-flops forming the boundary scan shift register, including flip-flops 71 (FIG. 3) and 95 (FIG. 4), the SHIFT DR shift signal can be negated. In addition, an UPDATE DR update signal will be asserted, which enables the flip-flops 72 and 96 to latch the respective signals provided thereto by the flip-flops 71 and 95. Thus, when the UPDATE DR signal is asserted, the flip-flop 72 (FIG. 3) will latch the output signal provided by the flip-flop 71, which corresponds to the particular bit of the boundary scan test vector to be finally latched by flip-flop 71 during the boundary scan test vector shift operation. The flip-flop 72 provides the latched signal to inverter 73, which provides an XMIT_BS-C transmit boundary scan-complement signal, which, in turn, is provided to multiplexers 61 and 65 of the transmit buffer 51. Inverter 74, in turn, complements the XMIT_BS-C signal to generate an XMIT_BS-T transmit boundary scan-true signal, which is provided to multiplexers 60 and 64 of the transmit buffer 51. Similarly, when the UPDATE DR signal is asserted, the flip-flop 96 (FIG. 4) will latch the output signal provided by the flip-flop 95, which corresponds to the particular bit of the boundary scan test vector to be finally latched by flip-flop 95 during the boundary scan test vector shift operation. The flip-flop 96, in turn, provides a RCVR_BS-T receiver boundary scan-true signal to one input of multiplexer 85.

During the boundary scan test operation, the BSM boundary scan mode signal will also asserted. In that condition, multiplexers 60 and 64 will couple the XMIT_BS-T transmit boundary scan-true signal as the respective SEL_XMIT DATA (T)-T selected transmit data (trailing)-true and SEL_XMIT_DATA (LET selected transmit data (leading)-true signals to the respective gated drivers 62 and 66. Similarly, multiplexers 61 and 65 will couple the XMIT_BS-C transmit boundary scan-complement signal as the respective SEL_XMIT_DATA (T)-C selected transmit data (trailing) complement and SEL_XMIT_DATA (L)-C selected transmit data (leading)-complement signals to the respective gated drivers 63 and 67. If the CLK clock signal is at this point in the asserted condition, the gated drivers 66 and 67 will be enabled to couple the respective SEL_XMIT_DATA (L)-T and SEL_XMIT_DATA (L)-C) signals as the SEL_XMIT_DATA-T selected transmit data-true and SEL_XMIT_DATA-C selected transmit data-complement signals for transmission by the differential driver 52 over the differential signal wires LINK (1) and LINK (0). On the other hand, if the CLK clock clock signal is at this point in the asserted condition, the gated drivers 66 and 67 will be enabled to couple the respective SEL_XMIT_DATA (T)-T and SEL_XMIT_DATA (T)-C) signals as the SEL_XMIT_DATA-T selected transmit data-true and SEL_XMIT_DATA-C selected transmit data-complement signals for transmission by the differential driver 52 over the differential signal wires LINK (1) and LINK (0). It will be appreciated, however, that, if the multiplexers 60, 61, 64 and 65 and gated drivers 62, 63, 66 and 67 are operating properly, the respective SEL_XMIT_DATA-T and SEL_XMIT_DATA-C signals will have the same condition regardless of whether the CLK clock signal is asserted or negated, in particular the respective conditions determined by the XMIT_BS-T and XMIT_BS-C transmit boundary scan true and complement signals generated by the inverters 74 and 73.

The differential signal transmitted by the differential driver 52 over differential signal wires LINK (1) and LINK (0) will be received by the differential receiver 80 and provided as the single-ended LINK DATA IN signal as described above. It will be appreciated that, if the differential signal wires and receiver 80 are operating properly, the LINK DATA IN signal is representative of the differential signal as transmitted by the differential transmitter 52. Since the SHIFT DR signal is at this point negated, the multiplexer 86 couples the LINK DATA IN signal to flip-flop 95. When the CLK DR clock signal is next asserted, the flip-flop 95 will latch the LINK DATA IN signal. The LINK DATA IN signal latched by flip-flop 95 corresponds to a bit of the boundary scan result vector, which can be shifted out in a manner similar to that described above in connection with shifting in of the boundary scan test vector. In that operation, the SHIFT DR shift signal will be asserted, to enable the boundary scan shift register to be reestablished as described above. On successive leading edges of the CLK DR clock signal, the bits comprising the boundary scan result vector will be shifted through the flip-flops comprising the boundary scan shift register, including flip-flop 95. The boundary scan result vector can be provided by the last flip-flop in the boundary scan shift register to a destination (not shown), which can analyze the boundary scan result vector as described above.

Returning to FIG. 3, it will be appreciated that, while the SHIFT DR shift signal is negated during the boundary scan test operation, the multiplexer 70 will also be enabled to couple a XMTR_SCAN_OUT (T) transmitter scan out (trailing) signal to the flip-flop 71. As will be described below in more detail connection with the internal scan mode, the XMTR_SCAN_OUT (T) signal is provided by a buffer comprising two serially-connected inverters 75 and 76, and corresponds to the LAT SEL DATA (T) IN latched selected data (trailing) signal provided by the flip-flop 53 in transmit buffer 51. Thus, while the contents of flip-flop 72 are being transmitted over the differential signal wires LINK (1) and LINK (0) as described above, the multiplexer 70 is coupling the XMTR_SCAN_OUT (T) transmitter scan out (trailing) signal, which is representative of the contents of flip-flop 53, to the input of flip-flop 71. The flip-flop 71 can latch the XMTR_SCAN_OUT (T) signal when the CLK DR signal is next asserted. Since this will occur while the SHIFT DR shift signal is negated, it will be appreciated that the flip-flop 71 will latch the XMTR_SCAN_OUT (T) transmitter scan out (trailing) signal contemporaneous with the latching by flip-flop 95 (FIG. 4) of the signal received from the differential driver 52 by the differential receiver 80 during the boundary shift test operation as described above.

As described above in connection with FIG. 3, the bit of the boundary scan test vector loaded in flip-flop 71 will be transferred to flip-flop 72 when the UPDATE DR update signal is asserted. Returning to FIG. 4, contemporaneously, the bit of the boundary scan test vector which is loaded in flip-flop 95 when the vector is shifted in will be transferred to flip-flop 96. Since the INT SCAN SEL internal scan select signal is negated while the transmitter circuit 40 and receiver circuit 41 are operating in the boundary scan test mode, a multiplexer 85 will couple the output signal provided by flip-flop 96 as a SEL TEST selected test signal to one input of multiplexer 84. Since, as described above, the BSM boundary scan mode signal is asserted during the boundary scan test operation, the multiplexer 84 will couple the SEL TEST signal to the inputs of flip-flops 90 and 91 as the SEL DATA IN selected data in signal.

In the internal scan test mode, the digital communications system (FIG. 1) performs an internal scan test operation, in which an internal scan test vector is shifted into flip-flops which are used during the normal operating mode, in particular flip-flops 53, 54 and 57 in the transmitter circuit 40, and flip-flops 90 and 92 of the receiver circuit, the CLK clock signal is allowed to toggle one or more times (that is, shift from the asserted to the negated condition or from the negated to the asserted condition), and then the contents of the flip-flops, which form an internal scan result vector, is shifted out of the flip-flops. Except for the flip-flops 53, 54 and 57 in the transmitter circuit 40 which is used to transmit the SL (i) CLK slice (i) clock signal, the bits of the internal scan test vector may comprise any value. As will be apparent from the following, for the flip-flops 53, 54 and 57 in transmitter circuit 40 which is used to transmit the SL (i) CLK slice (i) clock signal, the bits of the internal scan vector which will be stored in the flip-flops will preferably correspond to the bits defined by the respective DATA (T) IN data (trailing) in and DATA (L) IN data leading in signals provided thereto while in the normal operating mode. This will allow the transmitter circuit 40 which is used to transmit the SL (i) CLK slice (i) clock signal to transmit the signal as it would normally while the digital communications system is in the normal operating mode, which, in turn, will allow the receiver circuit 41 (FIG. 3) which receives the SL (i) CLK slice (i) clock signal to properly generate the RCV__ CLK signal and enable the other receiver circuits 41 to receive the respective signals transmitted thereto during the internal scan test operation.

While the internal scan test and result vectors are shifted into and out of the flip-flops, the INT SCAN SEL internal scan select signal is asserted, which interconnects the flip-flops which are to receive the internal scan test vector, and from which the internal scan result vector is to be retrieved, in a shift register, through which the respective vectors are shifted in response to successive respective edges of the CLK signal in the transmitter circuit 40 and an INT SCAN SHIFT CLK internal scan shift clock signal in the receiver circuit 41. The INT SCAN SHIFT CLK signal used to shift the internal scan result vector in receiver circuit 41 may comprise the clock signal generally used to synchronize operations in the slice receive circuit 30(i), illustratively the RCVR_CLK receiver clock signal as described in the aforementioned Cassiday patent application, since while the vectors are being scanned into and out of the flip-flops the condition of the RCV_CLK receive clock signal will generally not change.

More specifically, and with reference to FIG. 3, when the INT SCAN SEL internal scan select signal is asserted, the multiplexer 55 couples an XMTR_INT_SCAN_IN transmitter internal scan input signal as the SEL DATA (T) IN select data (trailing) in signal to the data input terminal of flip-flop 53. The XMTR_INT_SCAN_IN input signal represents either the output signal provided by a previous flip-flop in the internal scan shift register or, if the flip-flop 53 is the first flip-flop in the shift register, an internal scan vector source (not shown). The flip-flop 53 latches the SEL DATA (T) IN selected data (trailing) in signal on the next leading edge of the CLK clock signal and provides the LAT SEL DATA (T) IN-T latched selected data (trailing) in-true signal representative thereof, in the same manner as during the normal operating mode.

As indicated above, the LAT SEL DATA (T) IN-T latched selected data (trailing) in-true signal provided by flip-flop 53 is coupled to the buffer formed from the pair of serially-connected inverters 75 and 76 as the XMTR_SCAN_OUT (T) transmitter scan out (trailing) signal. The XMTR_ SCAN_OUT (T) signal is provided to one input of multiplexer 56. With the INT SCAN SEL internal scan select signal in the asserted condition, the multiplexer 56 couples the XMTR_SCAN_OUT (T) transmitter scan out (trailing) signal as the SEL DATA (L) IN selected data (leading) in signal to flip-flop 54, which latches the signal on the next leading edge of the CLK clock signal and provides the LAT SEL DATA (L) IN latched selected data (leading) in signal, in the same manner as during the normal operating mode. It will be appreciated that the LAT SEL DATA (L) IN-T signal provided by flip-flop 55 following the leading edge of the CLK clock signal at time "t" as the internal scan test vector is being shifted in, will correspond to the LAT SEL DATA (T) IN-T signal provided by flip-flop 53 following the leading edge of the CLK signal at time "t−1."

In addition, the flip-flop 57 will latch the LAT SEL DATA (L) IN signal provided by flip-flop 54 on the next trailing edge of the CLK clock signal, and provide the DEL SEL DATA (L) IN-T delayed selected data (leading) in-true signal in the same manner as during the normal operating mode. A buffer comprising two serially-connected inverters 77 and 78 couples the DEL SEL DATA (L) IN-T delayed selected data (leading) in-true signal from the flip-flop 57 as a XMTR_SCAN_OUT transmitter scan out signal, which, if a next flip-flop is connected in the internal scan vector shift register, will be coupled to that next flip-flop. It will be appreciated that the XMTR_SCAN_OUT transmitter scan out signal provided by inverter 77 following the trailing edge of the CLK clock signal at time "t+½" while the internal scan test vector is being shifted in, will correspond to the LAT SEL DATA (L) IN signal provided by flip-flop 54 following the leading edge of the CLK signal at time "t."

Thus, for the bit of the internal scan test vector represented by the XMTR_INT_SCAN_IN transmitter internal scan in signal latched by flip-flop 53 in response to the leading edge of the CLK signal at time "t−1," that bit will be latched by the flip-flop 54 in response to the leading edge of the CLK signal at time "t" and flip-flop 57 in response to the trailing edge of the CLK signal at time "t+½." Accordingly, following time "t+½," both flip-flops 54 and 57 will be storing bits of the internal scan test vector which represent the same value. In addition, if there is a next flip-flop in the internal scan shift register, that next flip-flop can latch the bit at time "t+1."

With reference to FIG. 4, when the INT SCAN SEL signal is asserted, the multiplexer 85 couples a RCVR_INT_SCAN_IN receiver internal scan in signal as the SEL TEST selected test signal to one input of multiplexer 84. The asserted INT SCAN SEL internal scan select signal also enables the NAND gate 87 to, in turn, couple the SEL TEST signal as the SEL DATA IN selected data in signal, which, in turn, is provided to flip-flops 90 and 91. The asserted INT SCAN SEL internal scan select signal enables the multiplexer 88 to couple the INT SCAN SHIFT CLK internal scan shift clock signal to the flip-flops 90, 91 and 92. The SEL DATA IN selected data in signal from multiplexer 84 will be latched by the flip-flop 90 on the leading edge of the INT SCAN SHIFT CLK signal, and by flip-flop 91 on the trailing edge of the INT SCAN SHIFT CLK internal scan shift clock signal.

As described above, the flip-flop 90 provides the latched SEL DATA IN signal as the RCV_DATA (L) receive data (leading) signal. The asserted INT SCAN SEL internal scan select signal enables the inverter 94 to, in turn, enable multiplexer 93 to couple the RCV_DATA (L) signal as the RCVR_SHIFT_DATA receiver shift data signal to flip-flop 92. The flip-flop 92 will latch the RCVR_SHIFT_DATA receiver shift data signal on the next leading edge of the INT SCAN SHIFT CLK internal scan shift clock signal. The flip-flop 92 will provide the latched signal as the RCV_ DATA (T) receive data (tailing) signal, which, if a next flip-flop is connected in the internal scan shift register, will also be provided as a RCVR_INT_SCAN_OUT receiver internal scan out signal to the next flip-flop.

Thus, for the bit of the internal scan test vector represented by the RCVR_INT_SCAN_IN receiver internal scan in signal latched by flip-flop 90 in response to the leading edge of the INT SCAN SHIFT CLK signal at time "r," that bit will be latched by the flip-flop 91 in response to the trailing edge of the INT SCAN SHIFT CLK signal at time "r+½" and flip-flop 92 in response to the leading edge of the INT SCAN SHIFT CLK signal at time "r+1." Accordingly, following time "r+1," both flip-flops 91 and 92 will be storing bits of the internal scan test vector which represent the same value. In addition, if there is a next flip-flop in the internal scan shift register, that next flip-flop can latch the bit at time "r+2."

After the internal scan test vector has been shifted into the flip-flops comprising the internal scan shift register as described above, the INT SCAN SEL internal scan select signal is negated. As a result, the multiplexer 55 (FIG. 3) is conditioned to couple the DATA (T) IN data (trailing) in signal as the SEL DATA (T) IN selected data (trailing) in signal to flip-flop 53, the multiplexer 56 (FIG. 3) is conditioned to couple the DATA (L) IN data (leading) in signal to flip-flop 54, and multiplexer 84 (FIG. 4) is conditioned to couple the LINK DATA IN signal to flip-flops 90 and 91, as in the normal operating mode as described above. The CLK clock signal is toggled one or more times, which allows the contents of the flip-flops 53 and 57 to be transmitted by transmitter circuit 40 and received by receiver circuit 41. In addition, since, as noted above, the signals representative of the internal scan test vector that are initially provided to provided to flip-flops 53 and 57 of the transmitter circuit 40 that is used to transmit the SL (i) CLK slice (i) clock signal are the same as the respective DATA (T) IN and DATA (L) IN data (trailing) and (leading) in signals provided during the normal operating mode, the transmitter circuit 40 will provide the SL (i) CLK signal in the same manner as during the normal operating mode, and the receiver circuit 44 will receive the SL (i) CLK slice (i) clock signal and generate the RCV_CLK receive clock signal in the same manner as during the normal operating mode. Accordingly, each of the receiver circuits 41 of the digital communications system will receive the respective signals transmitted thereto by the respective transmitter circuit and latch them in their respective flip-flops 90, 91 and 92 in the same manner as described above in connection with the normal operating mode. After the toggling of the CLK clock signal, the contents of the flip-flops will comprise the internal scan result vector, which will be shifted out of the digital communications system in a manner similar to that described above, with the result vector being provided by the last flip-flop in the internal scan shift register.

As noted above, the transmitter circuit 40 and the receiver circuit 41 can also operate in a link test mode, in which the receiver circuit 41 performs a link test in connection with the individual differential signal wires LINK (1) and LINK (0) to verify that each wire is continuous between the transmitter circuit 40 and the receiver circuit 41. As is conventional in connection with differential signals, the assertion or negation condition of the signal is defined by the difference in the voltage level applied to two wires, in this case the difference in between the voltage level applied to the LINK (1) wire and the voltage level applied to the LINK (0) wire, provided the difference between the voltage levels exceeds a predetermined threshold level. In that case, if one of the differential signal wires LINK (1) or LINK (0) is broken, typically the voltage level of the broken link tends to float at the receiver circuit 41, in which case the receiver circuit 41 may sometimes correctly receive the differential signal as transmitted by the transmitter circuit 40, and sometimes receive the differential signal incorrectly. Since the differential signal is intermittently correctly received, it is generally difficult to determine which of the LINK (1) or LINK (0) differential signal wire is broken. During the link test mode, the transmitter circuit 40 and the receiver circuit 41 can cooperate to determine whether one of the differential signal wires LINK (1) or LINK (0) is broken, and, if so, which one.

With reference to FIG. 4, the receiver circuit 41 includes three resisters 120, 121 and 122 connected in series between a pull up transistor 123 and a pull down transistor 124. Resistor 121 effectively forms a termination resistor for the differential link connecting the transmitter circuit 40 and receiver circuit 41. Current in the differential signal wires LINK (1) and LINK (0) sourced and sunk by the differential transmitter 52 (FIG. 3) develops a voltage difference between nodes 130 and 131 across resistor 121, which the differential receiver 81 receives as the differential signal. A bypass capacitor 125 is provided connected to the resistor 121 to ground high frequency transients in the signals received over the differential link. When the receiver circuit 41 is not operating in the link test mode, both a LINK TEST EN (1) link test enable (1) signal and a LINK TEST EN (0) link test enable (0) signal are negated, thereby to turn off both transistors 123 and 124 and allow the transmitter and receiver circuits 40 and 41 to operate as described above. However, while the receiver circuit 41 is operating in the link test mode, one of the LINK TEST EN (1) link test enable (1) signal or the LINK TEST EN (0) link test enable (0) signal will be asserted, which turns on the respective transistor 123 or 124 to apply a weak pull up or pull down, respectively, to enable the differential signal wires LINK (1) and LINK (0) to be tested as described below.

The assertion of the LINK TEST EN (1) signal while the receiver circuit 41 is operating in link test mode operates to turn on transistor 123. After asserting the LINK TEST EN (1) signal, the transmitter circuit 40 is enabled to transmit a negated signal over the differential signal wires LINK (1) and LINK (0), applying a signal defined by a relatively high voltage to wire LINK (0) and relatively low voltage to wire LINK (1). If both differential signal wires LINK (1) and LINK (0) are continuous, the negated signal applied by transmitter circuit 40 causes the voltage level at node 131 to be higher relative to the voltage level at node 130, which the differential receiver 80 will receive as a negated signal. On the other hand, if the differential signal wire LINK (0) is broken, the voltage level on that wire LINK (0) tends to float. However, since pull-up transistor 123 is on, resistor 120 applies a relatively high voltage to node 130, raising the voltage level at that node relative to the node 131, which the differential receiver 80 will receive as an asserted signal.

Continuing with the operations performed when the LINK TEST EN (1) signal is asserted while in the link test mode, if the transmitter circuit 40 thereafter places an asserted signal on the differential link interconnecting it and the receiver circuit 41, if both the differential signal wires LINK (1) and LINK (0) are continuous, the asserted signal applied by transmitter circuit 40 causes the voltage level at node 130 to be slightly higher relative to the voltage level at node 131, which the differential receiver 80 will receive as an asserted signal. On the other hand, if the wire LINK (1) is broken, the relatively weak pull up provided by transistor 123 and resistor 120 will be unable to allow the voltage difference between nodes 130 and 131 to increase above the required threshold, and so the differential receiver 80 will continue receiving the signal from the differential transmitter 52 as a negated signal.

Thus, while the LINK TEST EN (1) signal is asserted, the differential driver 52 is first enabled to transmit a negated signal over the differential signal wires LINK (1) and LINK (0). If the differential receiver 80 incorrectly receives the signal from the differential signal wires LINK (1) and LINK (0) as an asserted signal, then the wire LINK (0) is broken. However, if the differential receiver 80 correctly receives the signal as a negated signal, then the differential transmitter 52 is enabled to transmit an asserted signal over the differential signal wires LINK (1) and LINK (0). If the differential receiver 80 properly receives the signal as an asserted signal, then both differential signal wires LINK (1) and LINK (0) are operating properly. However, if the differential receiver 80 incorrectly receives the signal from the differential signal wires LINK (1) and LINK (0) as a negated signal, then the wire LINK (0) is broken.

Complementary operations can be performed during while operating in link test mode by negating the LINK TEST EN (1) signal and asserting the LINK TEST EN (0) link test enable (0) signal. In that condition, the pull up transistor 123 will be turned off, and the pull down transistor 124 will be turned on to apply a weak pull down voltage through resistor 122 to node 131, which decreases the voltage level of node 130 relative to node 131. After asserting the LINK TEST EN (0) signal, the transmitter circuit 40 is enabled to transmit an asserted signal over the differential signal wires LINK (1) and LINK (0), applying a signal defined by a relatively high voltage to wire LINK (1) and relatively low voltage to wire LINK (0). If both differential signal wires LINK (1) and LINK (0) are continuous, the asserted signal applied by transmitter circuit 40 causes the voltage level at node 130 to be higher relative to the voltage level at node 131, which the differential receiver 80 will receive as an asserted signal. On the other hand, if the differential signal wire LINK (1) is broken, the voltage level on that wire LINK (1) tends to float. However, since pull-down transistor 124 is on, resistor 122 applies a relatively low voltage to node 131, lowering the voltage level at that node relative to the node 130, which the differential receiver 80 will receive as a negated signal.

Continuing with the operations performed when the LINK TEST EN (0) signal is asserted while in the link test mode, if the transmitter circuit 40 thereafter places a negated signal on the differential link interconnecting it and the receiver circuit 41, if both the differential signal wires LINK (1) and LINK (0) are continuous, the negated signal applied by transmitter circuit 40 causes the voltage level at node 130 to be slightly lower relative to the voltage level at node 131, which the differential receiver 80 will receive as a negated signal. On the other hand, if the wire LINK (1) is broken, the relatively weak pull down provided by transistor 124 and resistor 122 will be unable to allow the voltage difference between nodes 131 and 130 to increase above the required threshold, and so the differential receiver 80 will continue receiving the signal from the differential transmitter 52 as an asserted signal.

Thus, while the LINK TEST EN (0) signal is asserted, the differential driver 52 is first enabled to transmit an asserted signal over the differential signal wires LINK (1) and LINK (0). If the differential receiver 80 incorrectly receives the signal from the differential signal wires LINK (1) and LINK (0) as a negated signal, then the wire LINK (1) is broken. However, if the differential receiver 80 correctly receives the signal as an asserted signal, then the differential transmitter 52 is enabled to transmit a negated signal over the differential signal wires LINK (1) and LINK (0). If the differential receiver 80 properly receives the signal as a negated signal, then both differential signal wires LINK (1) and LINK (0) are operating properly. However, if the differential receiver 80 incorrectly receives the signal from the differential signal wires LINK (1) and LINK (0) as an asserted signal, then the wire LINK (0) is broken.

It will be appreciated that the test results determined during the test operations performed while in the link test mode are complementary; that is, the link test may be performed to verify continuity of both the LINK (1) and the LINK (0) wires using only one of the LINK TEST EN (1) signal or the LINK TEST EN (0) signal. Alternatively, the link test may be performed using both the LINK TEST EN (1) signal and the LINK TEST EN (0) signal. If both the LINK TEST EN (1) signal and the LINK TEST EN (0) signal are used, each signal will be asserted in a separate phase of the link test, and one or both of the LINK (1) and LINK (0) wires can be tested in each phase; if both wires are tested in each phase, the test is expected to provide, for each wire, the same continuity determination in both phases.

The transmitter and receiver circuits 40 and 41 as described above provide a number of benefits. First, since, as noted above, the signals to be transmitted by the transmitter circuit 40 (FIG. 3) are latched in the respective flip-flops 53 and 57 one-half cycle of the CLK clock signal, they will have sufficient time to propagate through circuitry between the respective flip-flops 53 and 57 and respective gated drivers 62, 63, 66 and 67 before the drivers are enabled to gate their respective signals to the differential transmitter 52 by the CLK signal. This serves both to minimize the propagation delay of the respective signals along the respective signal paths to the differential driver 52 and also to minimize differences in propagation delay as between the signal paths from gated drivers 62 and 63 to the differential driver 52, and the signal paths from gated drivers 66 and 67 to the differential driver. The latter (that is, minimization of differences in propagation delays between the respective sets of signal paths) will ensure that the signal transmission properties of the signals transmitted on the respective leading and trailing edges of the CLK signal will be similar.

In addition, by providing that the transmitter circuit 40 that transmits the SL (i) CLK slice (i) clock signal and the receiver circuit 41 that receives the SL (i) CLK signal, transmits and receives the respective signal in the same manner as that of the circuits 40 and 41 that transmit and receive the other signals, that is, the FRAME (i) frame (i) and SLICE (i) DATA slice (i) data signals, the timing, propagation delay and other transmission characteristics of the SL (i) CLK slice (i) clock signal will correspond to those of the other signals.

Furthermore, by providing in the transmitter circuit that the boundary scan circuitry provides the XMIT_BS-T and XMIT_BS-C transmit boundary scan-true and -complement signals to multiplexers 60, 61, 64 and 65 ahead of the multiplexer formed from gated drivers 62, 63, 66 and 67, instead of between the gated drivers 62, 63, 66 and 67 and the differential driver 52, the boundary scan logic does not provide a delay in the transmission of signals from the gated drivers 62, 63, 66 and 67 by the differential driver 52.

It will be appreciated that a number of modifications may be made to the transmitter and receiver circuits 40 and 41 as described above. For example, although the transmitter and receiver circuits have been described in the context of a digital communications system such as that described in the aforementioned Cassiday patent application, it will be appreciated that the respective transmitter and receiver circuits can be used advantageously in a number of communications arrangements. In addition, it will be appreciated that the transmitter circuit may be used in a digital communications system in which the receiver circuit described herein is not used, and the receiver circuit may be used in a digital communications system in which the transmitter circuit described herein is not used.

In addition, it will be appreciated that, in embodiments in which one or more of the boundary scan, internal test scan or link test modes is not to be provided, circuitry used solely in the respective mode need not be provided. In addition, although the receiver circuit 41 used for receiving the SL (i) CLK slice (i) clock signal been described as also including the input select circuit 81 and the receive buffer 82, since the same cell comprising the receiver circuit 41 is used for both that signal and the other signals (that is, the FRAME (i) and SLICE (i) DATA signals), it will be appreciated that a cell for the receiver circuit 41 for the SL (i) CLK signal can be provided with the buffer 83 but without the input select circuit 81 and receive buffer 82. In addition, a cell for the receiver circuit 41 for the other signals, that is, the FRAME (i) and SLICE (i) DATA signals, can be provided with the input select circuit 81 and receive buffer 82 but without the buffer 83.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A transmitter circuit for transmitting digital data over a communication link, said transmitter circuit comprising:
    A. a plurality of gated driver circuits each associated with one of a plurality separate phases of a clock signal, all of said gated driver circuits having respective outputs connected to said communication link, each gated driver circuit receiving at a respective input a respective one of a plurality of selected information signals and transmitting it over said communication link in response to the associated clock signal phase;
    B. a plurality of information selectors, each associated one of said gated driver circuits, each information selector being connected to receive a plurality of information signals each from a respective one of a plurality of digital information sources and selectively couple one of said information signals to the associated gated driver circuit as the respective selected information signal during a clock signal phase ahead of the clock signal phase ahead of the clock signal phase with which the associated gated driver circuit is associated.

2. A transmitter circuit as defined in claim 1 in which the clock signal phase during which each information selector couples the respective selected information signal to the associated gated driver is selected so that the respective selected information signal will be settled at the input of the associated gated driver at the beginning of the gated driver's associated clock signal phase.

3. A transmitter circuit as defined in claim 1 in which:
    A. said communication link is a differential communication link, said transmitter circuit further comprising a differential driver connected to said differential communication link;
    B. each information selector provides as said selected information signal a true selected information signal and a complement selected information signal; and
    C. the gated driver circuit associated with each information selector comprises two gated drivers each of which receives one of said true selected information signal and said complement selected information signal and in response to the associated clock signal phase couples them to the differential driver for transmission over said differential communication link.

4. A transmitter circuit as defined in claim 1 in which said clock signal phases are defined by the leading and trailing edges of a unitary clock signal, the transmitter circuit comprising two gated driver circuits one of which is enabled on the leading edge of said unitary clock signal and the other of which is enabled on the trailing edge of said unitary clock signal.

5. A transmitter circuit as defined in claim 1 in which each said information selector comprises:
    A. a plurality of buffers each for buffering one of said information signals from a respective one of said digital information sources, each buffer providing a buffered information signal; and
    B. a multiplexer for receiving the buffered information signals from the plurality of buffers and selectively coupling one of said buffered information signal as said selected information signal.

6. A transmitter circuit as defined in claim 5 in which, for each said information selectors, at least one of said plurality of buffers receives said one of said information signals for buffering in response to one of said clock signal phases which differs from the clock signal phase with which the associated gated driver circuit is associated.

7. A transmitter circuit as defined in claim 5 in which each buffer includes a storage element for storing a respective one of said information signals, the storage elements further being connected in an internal scan chain to facilitate shifting an internal scan vector into said the storage elements while operating in an internal scan test mode, the storage elements providing said scan vector to said multiplexer as the respective one of said buffered information signals.

8. A transmitter circuit as defined in claim 1 in which each said information selector comprises:
    A. at least one delay line for buffering information represented by an information signal from a respective one of said digital information sources and providing a delayed information signal, all of the delay lines receiving information represented by a respective one of the information signal in response to the same clock signal phase and providing the delayed information signal with a delay representative of the clock signal phase associated with the associated gated driver circuit; and
    B. a multiplexer for selectively coupling the delayed information signal from said at least one delay line and said information signal from at least one other information source as said selected information signal.

9. A transmitter circuit as defined in claim 1 in which at least one of said information sources is a boundary scan information source.

10. For use in an information transmission system, a transmitter circuit for transmitting a digital data signal over a communication link on both a leading edge and a trailing edge of a clock signal, said transmitter circuit comprising:
    A. a leading edge gated driver circuit for receiving at an input a leading edge selected information signal and transmitting it over said communication link as said digital data signal in response to the leading edge of said clock signal, the leading edge gated driver circuit being disabled at the trailing edge of said clock signal;

B. a leading edge information selector comprising:
   (i) a leading edge multiplexer for selectively coupling one of a buffered information signal from a leading edge buffer and an information signal from at least one other information source to said leading edge gated driver circuit as the leading edge selected information signal;
   (i) the leading edge buffer for receiving and buffering leading edge transmit information from a transmit information source, the leading edge buffer receiving the leading edge information in response to the leading edge of said clock signal and providing the buffered leading edge transmit information to the leading edge multiplexer on a subsequent trailing edge of the clock signal, so that the leading edge selected information signal will be settled at the input of the leading edge gated driver at the leading edge of the clock signal;

C. a trailing edge gated driver circuit for receiving at an input a trailing edge selected information signal and transmitting it over said communication link as said digital data signal in response to the trailing edge of said clock signal, the trailing edge gated driver circuit being disabled at the leading edge of said clock signal; and D. a trailing edge information selector comprising:
   (i) a trailing edge multiplexer for selectively coupling one of a buffered information signal from a trailing edge buffer and an information signal from at least one other information source to said trailing edge gated driver circuit as the trailing edge selected information signal;
   (i) the trailing edge buffer for receiving and buffering trailing edge transmit information from the transmit information source, the trailing edge buffer receiving the trailing edge information in response to the leading edge of said clock signal and providing the buffered trailing edge transmit information to the leading edge multiplexer so that the trailing edge selected information signal will be settled at the input of the trailing edge gated driver at the trailing edge of the clock signal.

11. For further use in connection with the information transmission system as defined in claim 10, a receiver circuit comprising:

A. a receiver for receiving said digital data signal from said communication link and for providing said digital data signal as a received data signal;

B. a receive buffer comprising:
   (i) a leading edge receive buffer for receiving and buffering said received data signal in response to a leading edge of a receive clock signal and providing the received data signal as a leading edge received data signal to a downstream utilization element; and
   (ii) a trailing edge receive buffer for receiving and buffering said received data signal in response to a trailing edge of said receive clock signal and providing the received data signal as a trailing edge received data signal at the next leading edge of the received clock signal, so that, if the digital data signal provided by the transmitter circuit corresponds to information from the transmit information source, the leading edge received data signal provided by the leading edge receive buffer and the trailing edge received data signal provided by the trailing edge receive buffer at each leading edge of the received clock signal correspond to the leading and trailing edge transmit information received by the respective leading edge buffer and trailing edge buffer in response to the leading edge of the clock signal.

\* \* \* \* \*